(12) United States Patent
Ito et al.

(10) Patent No.: US 8,407,731 B2
(45) Date of Patent: Mar. 26, 2013

(54) MOTOR WITH A CHUCKING DEVICE HAVING A TURNTABLE AND A PLURALITY OF BALLS, AND A DISK DRIVE APPARATUS INCLUDING THE MOTOR

(75) Inventors: Haruhiko Ito, Kyoto (JP); Takuya Yamane, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 12/984,698

(22) Filed: Jan. 5, 2011

(65) Prior Publication Data

US 2011/0167436 A1 Jul. 7, 2011

(51) Int. Cl.
*G11B 17/028* (2006.01)
*H02K 5/24* (2006.01)
(52) U.S. Cl. .......................... 720/702; 310/51
(58) Field of Classification Search ............. 310/51; 720/702, 695, 704, 705
See application file for complete search history.

(56) References Cited

U.S. PATENT DOCUMENTS

| | | | |
|---|---|---|---|
| 6,198,715 B1 | 3/2001 | Kouno et al. | |
| 6,256,289 B1 | 7/2001 | Miyamoto | |
| 6,333,912 B1* | 12/2001 | Sohn | 720/702 |
| 6,348,747 B1* | 2/2002 | Liao et al. | 310/51 |
| 6,477,133 B1* | 11/2002 | Yoshimura et al. | 720/702 |
| 6,479,912 B2* | 11/2002 | Kikuchi et al. | 310/51 |
| 6,711,116 B2* | 3/2004 | Masaki et al. | 720/702 |
| 7,911,092 B2* | 3/2011 | Kim | 310/67 R |
| 8,037,490 B2* | 10/2011 | Park | 720/696 |
| 2002/0118631 A1* | 8/2002 | Kuo et al. | 369/264 |
| 2002/0184965 A1* | 12/2002 | Honda | 74/573 R |
| 2003/0031113 A1* | 2/2003 | Asano | 369/263 |
| 2007/0150911 A1* | 6/2007 | Kim | 720/702 |
| 2007/0294712 A1* | 12/2007 | Ito et al. | 720/702 |
| 2009/0064212 A1 | 3/2009 | Ito et al. | |
| 2009/0125930 A1* | 5/2009 | Smirnov et al. | 720/702 |
| 2009/0150915 A1* | 6/2009 | Woo | 720/702 |
| 2009/0183191 A1* | 7/2009 | Park | 720/695 |
| 2010/0084930 A1* | 4/2010 | Kim | 310/51 |
| 2010/0146525 A1* | 6/2010 | Kim et al. | 720/604 |
| 2011/0119692 A1 | 5/2011 | Ito et al. | |
| 2011/0296448 A1* | 12/2011 | Kim | 720/702 |

FOREIGN PATENT DOCUMENTS

| | | |
|---|---|---|
| JP | 3045377 U | 1/1998 |
| JP | 10-092094 A | 4/1998 |
| JP | 2000-014113 A | 1/2000 |
| JP | 2000-245116 A | 9/2000 |
| JP | 2001-037141 A | 2/2001 |
| JP | 2001-216718 A | 8/2001 |
| JP | 2003-299302 A | 10/2003 |
| JP | 2004-064865 A | 2/2004 |
| JP | 2006-079727 A | 3/2006 |
| JP | 2008-005584 A | 1/2008 |
| JP | 2009-059410 A | 3/2009 |

* cited by examiner

*Primary Examiner* — Julie Anne Watko
(74) *Attorney, Agent, or Firm* — Westerman, Hattori, Daniels & Adrian, LLP

(57) ABSTRACT

A chucking device includes a disk support unit on which a disk is placed, a resin-made turntable arranged to directly or indirectly support the disk support unit from below, a metal member including a circular plate portion closely secured to a lower surface of the turntable, and a plurality of balls rollably arranged below the disk support unit and above the circular plate portion about a center axis in a circumferential direction. The turntable includes an antiskid member, a bottom rolling surface arranged to support the balls from below through the antiskid member and a cylindrical side rolling surface positioned radially outwards of the balls.

23 Claims, 13 Drawing Sheets

MOTOR WITH A CHUCKING DEVICE HAVING A TURNTABLE AND A PLURALITY OF BALLS, AND A DISK DRIVE APPARATUS INCLUDING THE MOTOR

BACKGROUND OF THE INVENTION

1. Field of the Invention

The present invention relates to a chucking device, a motor, a disk drive apparatus and a chucking device manufacturing method.

2. Description of the Related Art

A disk drive apparatus such as an optical disk drive or the like is equipped with a brushless motor for rotating a disk. The brushless motor includes a chucking device that rotates together with a rotary unit. The chucking device is capable of holding a disk in place. The disk drive apparatus can rotate the disk by driving the brushless motor while holding the disk in place with the chucking device.

In recent years, the rotation speed of a brushless motor tends to become higher along with the increase in the operation speed of the disk drive apparatus. As the rotation speed of the brushless motor gets increased, a vibration problem is likely to occur. One of the causes of brushless motor vibration is the eccentricity in the gravity center of a disk. The disk gravity center suffers from individual variability and differs from disk to disk. The vibration problem is apt to occur if the gravity center of the rotary unit of the brushless motor and the disk as a whole does not coincide with the rotation center of the rotary unit.

In case where a plurality of rolling balls is arranged along the circumferential direction of the rotary unit, noises are generated due to the rolling movement of the balls. The noises attributable to the rolling movement of the balls are highly likely to generate during acceleration and deceleration of the brushless motor and after stoppage thereof. In order to reduce such noises, it is thinkable, for example, to attach shock-absorbing materials to the surfaces of the rotary unit with which the balls make contact. If the shock-absorbing materials are attached to all the surfaces with which the balls make contact, the resistance to the balls becomes greater. This may hinder the smooth rolling movement of the balls.

SUMMARY OF THE INVENTION

The present invention is capable of providing a technique for reducing the noises caused by the rolling movement of circumferentially rolling balls of a chucking device.

In accordance with a first aspect of the present invention, there is provided a chucking device including: a disk support unit on which a disk is placed; a resin-made turntable arranged to directly or indirectly support the disk support unit from below; a metal member including a circular plate portion closely secured to a lower surface of the turntable; and a plurality of balls rollably arranged below the disk support unit and above the circular plate portion about a center axis in a circumferential direction. The turntable includes an antiskid member, a bottom rolling surface arranged to support the balls from below through the antiskid member and a cylindrical side rolling surface positioned radially outwards of the balls.

In accordance with a second aspect of the present invention, there is provided a method for manufacturing a chucking device including a plurality of balls rollably arranged about a center axis in a circumferential direction and a turntable arranged to hold the balls, the method including: arranging a metal member with a circular plate portion within a cavity defined between a pair of molds; pouring a molten resin into the cavity; solidifying the resin within the cavity to form a turntable unified with the metal member; and removing the turntable and the metal member from the molds. The upper surface of the circular plate portion and the lower surface of the turntable are closely secured to each other, and a bottom rolling surface arranged below the balls and a cylindrical side rolling surface arranged radially outwards of the balls are formed in the turntable.

In the aspects of the present invention, the circular plate portion of the metal member is closely secured to the lower surface of the resin-made turntable. This helps reduce the amplitude of the sound generated by the rolling movement of the balls. Accordingly, it is possible to reduce the noises generated in the chucking device.

Other features, elements, steps, characteristics and advantages of the present invention will become more apparent from the following detailed description of preferred embodiments of the present invention with reference to the attached drawings.

DETAILED DESCRIPTION OF THE INVENTION

Preferred embodiments of the present invention will now be described with reference to the accompanying drawings. In the following description on the shape and positional relationship of the respective components, the direction running along the center axis of a chucking device will be referred to as "vertical direction" and the side of a turntable at which a disk is positioned will be referred to as "upper". However, these definitions are used merely for the sake of convenience in description and are not intended to limit the postures of a motor and a disk drive apparatus of the present invention when they are in use.

(1. Chucking Device of a Preferred Embodiment)

Figure 1:
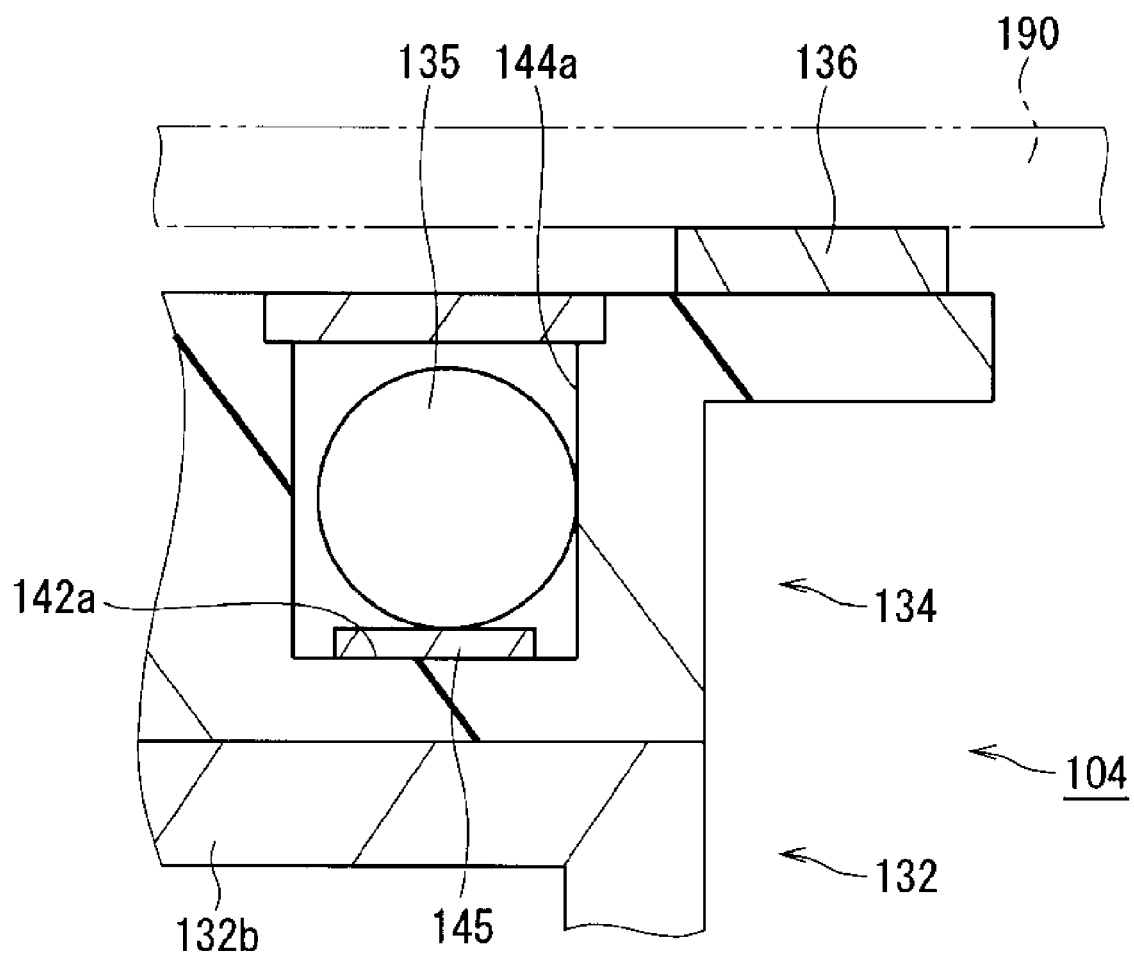
FIG. 1 is a partial vertical section view showing a chucking device.

FIG. 1 is a partial vertical section view showing a chucking device 104 according to a preferred embodiment of the present invention. As shown in FIG. 1, the chucking device 104 preferably includes a disk support unit 136, a turntable 134, a metal member 132 and a plurality of balls 135.

The disk support unit 136 is a portion on which a disk 190 is placed. The turntable 134 is a resin-made member arranged to directly or indirectly support the disk support unit 136 from below. The metal member 132 is preferably provided with a circular plate portion 132b closely secured to the lower surface of the turntable 134. The balls 135 are arranged below the disk support unit 136 and above the circular plate portion 132b. Furthermore, the balls 135 are arranged to make rolling movement about the center axis in the circumferential direction.

The turntable 134 preferably includes a bottom rolling surface 142a and a side rolling surface 144a. The bottom rolling surface 142a is a surface arranged below the balls 135. The bottom rolling surface 142a supports the balls 135 from below through an antiskid member 145. The side rolling surface 144a is a cylindrical surface positioned radially outwards of the balls 135.

During the process of manufacturing the chucking device 104, the turntable 134 and the metal member 132 are unified by insert-molding. More specifically, the metal member 132 is first put within a cavity defined between a pair of molds. Then, a molten resin is poured into the cavity. Subsequently, the resin filled in the cavity is solidified to form the turntable 134 and to unify the turntable 134 and the metal member 132. At this time, the upper surface of the circular plate portion 132b of the metal member 132 is closely secured to the lower surface of the turntable 134. The bottom rolling surface 142a and the side rolling surface 144a are provided in the turntable 134. Thereafter, the turntable 134 and the metal member 132 thus unified are removed from the molds.

In this manner, the circular plate portion 132b of the metal member 132 is closely secured to the lower surface of the resin-made turntable 134 in the chucking device 104 of the present embodiment. This helps reduce the amplitude of the noises generated by the rolling movement of the balls 135, eventually reducing the noises generated in the chucking device 104.

(2. More Specific Preferred Embodiment)
(2-1. Configuration of Disk Drive Apparatus)

Next, description will be made on a more specific preferred embodiment of the present invention.

Figure 2:
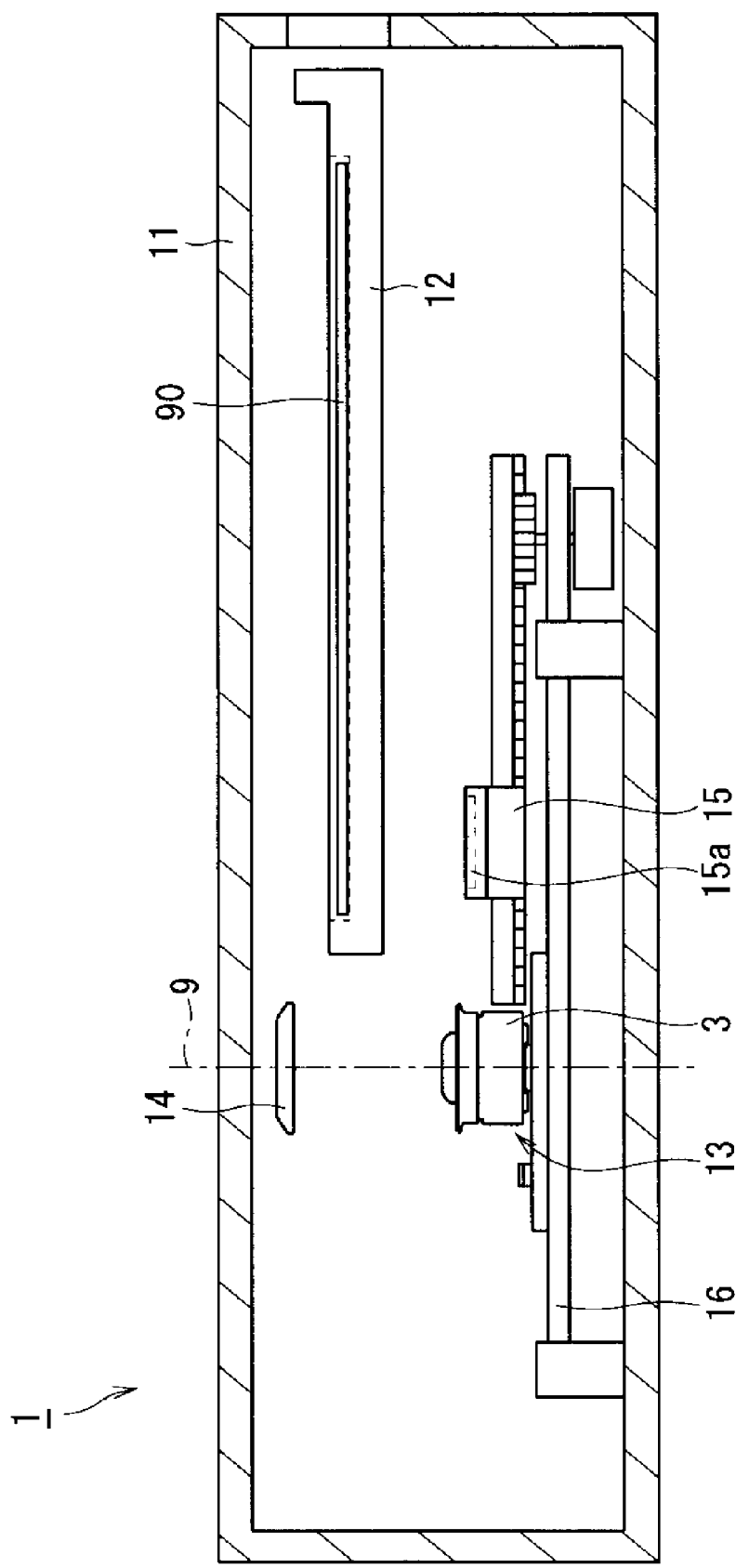
FIG. 2 is a vertical section view showing a disk drive apparatus.

FIG. 2 is a vertical section view showing a disk drive apparatus 1. The disk drive apparatus 1 is an apparatus arranged to read and write information from and on an optical disk 90 (hereinafter just referred to as "disk 90") while rotating the same. The disk drive apparatus 1 preferably includes an apparatus housing 11, a disk tray 12, a brushless motor 13, a clamper 14 and an access unit 15.

The apparatus housing 11 is a housing arranged to accommodate the disk tray 12, the brushless motor 13, the clamper 14 and the access unit 15 therein. The disk tray 12 is a mechanism arranged to transfer the disk 90 between the inside and outside of the apparatus housing 11. The brushless motor 13 is fixed to a chassis 16 provided within the apparatus housing 11. If the disk 90 is put on the disk tray 12, the disk 90 is transferred to the brushless motor 13 from the disk tray 12. The disk 90 thus transferred is held between the rotary unit 3 of the brushless motor 13 and the clamper 14. The disk 90 is rotated about the center axis 9 by the brushless motor 13.

The access unit 15 preferably includes a head 15a having an optical pickup function. The access unit 15 performs information reading and writing operations with respect to the disk 90 by causing the head 15a to move along the recording surface of the disk 90 held by the brushless motor 13. Alternatively, the access unit 15 may perform only one of the information reading and writing operations with respect to the disk 90.

(2-2. Configuration of Brushless Motor)

Next, description will be made on the configuration of the brushless motor 13.

Figure 3:
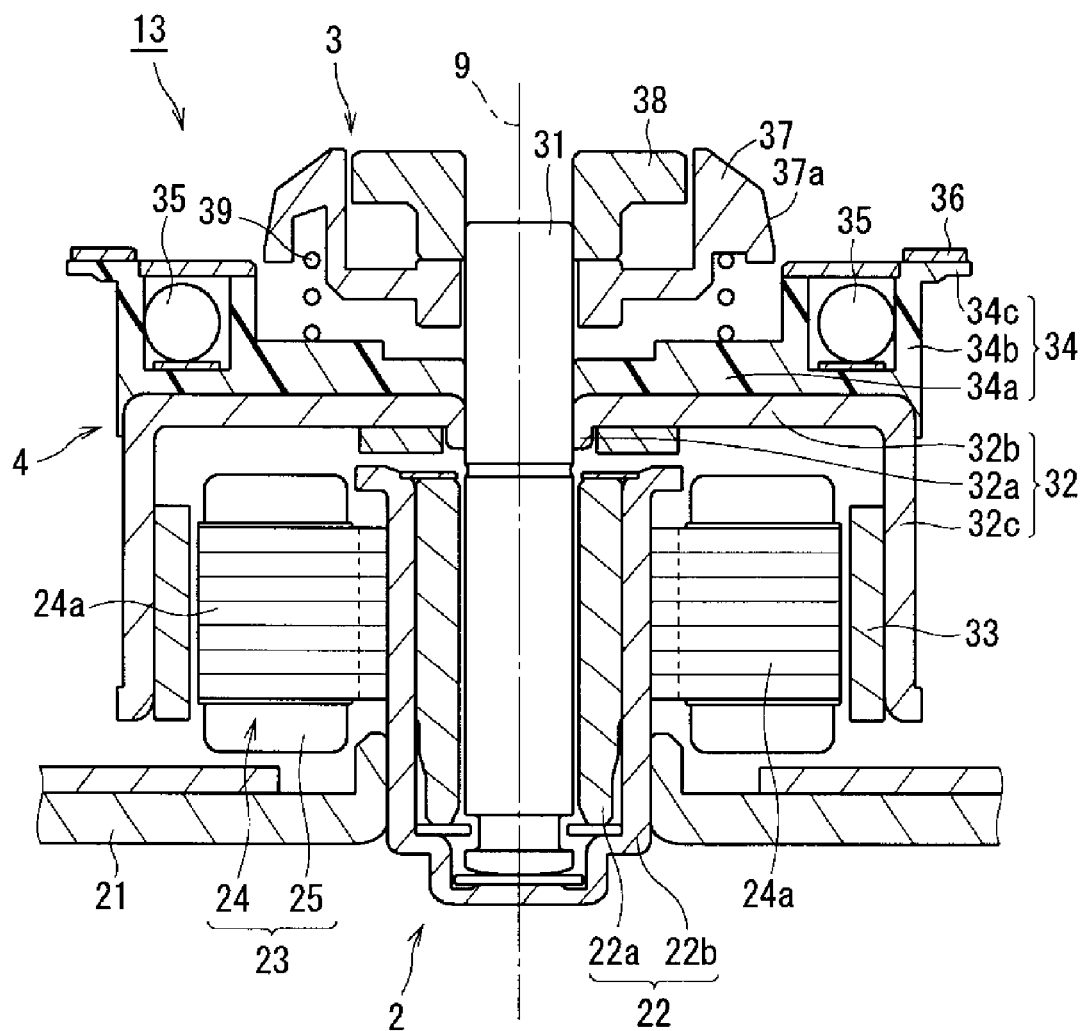
FIG. 3 is a vertical section view showing a brushless motor.

FIG. 3 is a vertical section view showing the brushless motor 13. As shown in FIG. 3, the brushless motor 13 preferably includes a stationary unit 2 and a rotary unit 3. The stationary unit 2 is fixed to the chassis 16 of the disk drive apparatus 1. The rotary unit 3 is rotatably supported by the stationary unit 2.

The stationary unit 2 preferably includes a base member 21, a stationary bearing unit 22 and a stator unit 23. The stationary bearing unit 22 is fixed to the base member 21. The stationary bearing unit 22 is a mechanism arranged to rotatably support a shaft 31. The stationary bearing unit 22 preferably includes a sleeve 22a and a sleeve housing 22b. The sleeve 22a is a substantially cylindrical member surrounding the outer circumferential surface of the shaft 31. The sleeve housing 22b is a substantially cup-shaped member accommodating the sleeve 22a therein. The stator unit 23 preferably includes a stator core 24 having a plurality of tooth portions 24a and coils 25 wound around the respective tooth portions 24a.

The rotary unit 3 preferably includes a shaft 31, a rotor holder 32, a rotor magnet 33, a turntable 34, a plurality of balls 35, a disk support member 36, a cone 37 and a yoke 38. The shaft 31 is a substantially cylindrical columnar member extending vertically along the center axis 9. The rotor holder 32 is a metallic member and is fixed to the shaft 31 for rotation therewith.

The rotor holder 32 preferably includes a fastening portion 32a, a circular plate portion 32b and a holder portion 32c. The fastening portion 32a is a substantially cylindrical portion to which the shaft 31 is press-fitted. The circular plate portion 32b is a portion extending radially outwards from the upper end of the fastening portion 32a. The holder portion 32c is a substantially cylindrical portion extending downwards from the radial outer edge of the circular plate portion 32b to hold the rotor magnet 33 on the inner circumferential surface thereof. In the present preferred embodiment, the rotor magnet 33 is an annular permanent magnet. The inner circumferential surface of the rotor magnet 33 is a magnetic pole surface radially opposed to the end surfaces of the tooth portions 24a of the stator core 24.

The turntable 34 is a resin-made member and is fixed to the rotor holder 32 for rotation therewith. The turntable 34 preferably includes a planar portion 34a, a ball retainer portion 34b and a protrusion portion 34c. The planar portion 34a is a disk-shaped portion positioned below the cone 37. The ball retainer portion 34b is a portion arranged to retain the balls 35 at the radial outer side of the planar portion 34a. The balls 35 are arranged within the ball retainer portion 34b in the circumferential direction to make rolling movement. The balls 35 and the surrounding structures thereof will be described later.

The protrusion portion 34c is a portion protruding radially outwards from the upper end of the outer circumferential surface of the ball retainer portion 34b. The disk support member 36 is fixed to the upper surface of the protrusion portion 34c of the turntable 34. The upper surface of the disk support member 36 serves as a placement surface on which the disk 90 is placed.

The cone 37 is a member arranged to support the inner circumferential portion of the disk 90. The cone 37 is attached to the shaft 31 at the upper side of the planar portion 34a of the turntable 34 so that it can make axial sliding movement with respect to the shaft 31. The cone 37 preferably includes a slant surface 37a whose diameter gets gradually increased downwards. The cone 37 supports the disk 90 with the inner circumferential portion of the disk 90 kept in contact with the slant surface 37a. Thus, the center of the disk 90 is positioned in alignment with the center axis 9.

An axially extendible spring member 39 is arranged between the planar portion 34a of the turntable 34 and the cone 37. The spring member 39 applies an upwardly biasing force to the cone 37. The yoke 38 is a magnetic body fixed to the upper end of the shaft 31. The cone 37 stays in contact with the lower surface of the yoke 38 when the disk 90 is not held in place. The yoke 38 generates a magnetic attraction force between itself and the clamp magnet provided in the clamper 14. By virtue of the attraction force, the disk 90 is held between the disk support member 36, the cone 37 and the clamper 14.

In the present preferred embodiment, at least the rotor holder 32, the turntable 34, the balls 35, the disk support member 36 and the cone 37 of the rotary unit 3 make up a chucking device 4 which holds the disk 90 in place.

In the brushless motor 13 of this configuration, if a drive current is applied to the coils 25 of the stationary unit 2, magnetic flux is generated in the tooth portions 24a of the stator core 24. Circumferentially-acting torque is generated by the magnetic flux flowing between the tooth portions 24a and the rotor magnet 33. The torque thus generated causes the rotary unit 3 to rotate about the center axis 9 with respect to the stationary unit 2. The disk 90 held in place by the rotary unit 3 is rotated about the center axis 9 together with the rotary unit 3.

(2-3. Ball and Surrounding Structure)

Figure 4:
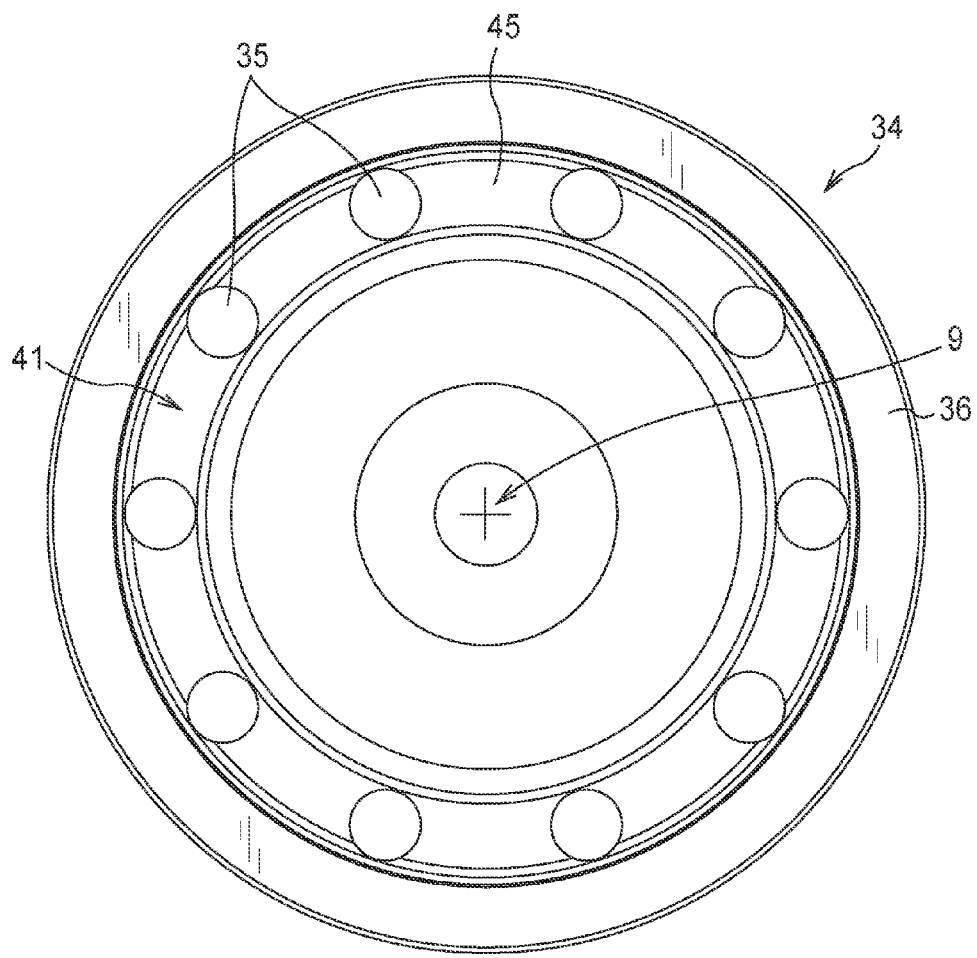
FIG. 4 is a top view showing a turntable, a plurality of balls and a disk support member.
Figure 5:
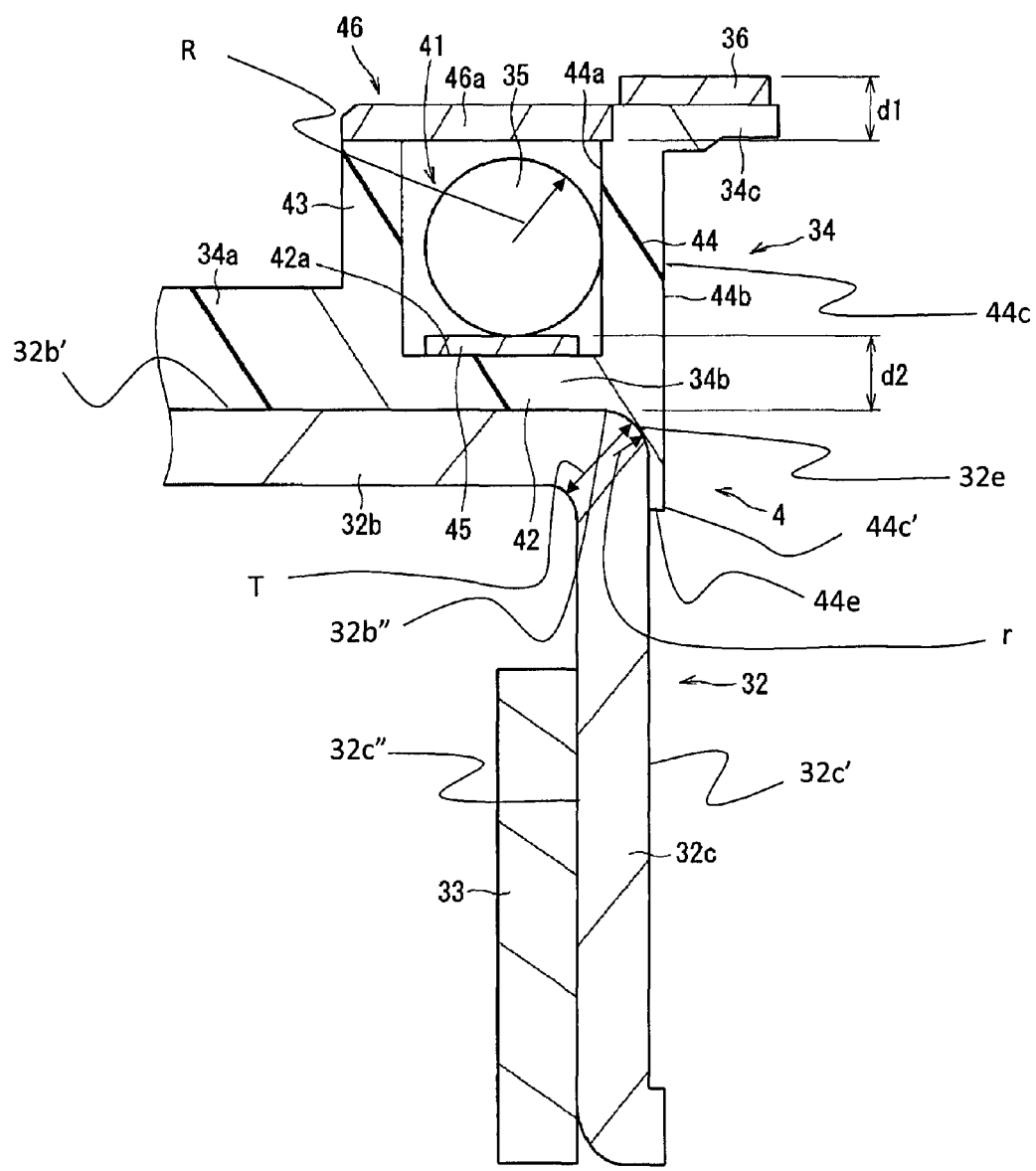
FIG. 5 is a partial vertical section view showing the outer circumferential portion of a rotary unit and its vicinities.

FIG. 4 is a top view showing the turntable 34, the balls 35 and the disk support member 36. FIG. 5 is a partial vertical section view showing the outer circumferential portion of the rotary unit 3 and its vicinities. As shown in FIGS. 4 and 5, an annular groove 41 is provided in the ball retainer portion 34b of the turntable 34. The groove 41 is defined at the upper surface side of the ball retainer portion 34b. That is to say, the groove 41 is opened upwards.

The balls 35 are accommodated within the groove 41 to make rolling movement in the circumferential direction. The balls 35 are axially positioned below the disk support member 36 and above the circular plate portion 32b of the rotor holder 32. The balls 35 are made of, e.g., non-magnetic stainless steel. Alternatively, the balls 35 may be made of other materials.

The balls 35 serve to correct the positional deviation of the gravity center of the rotary unit 3 and the disk 90 as a whole from the center axis 9. If the rotary unit 3 and the disk 90 are rotated at a specific revolution number or more, the balls 35 are rolled and moved away from the center axis 9 in the direction opposite to the gravity center. Consequently, the gravity center of the rotary unit 3 and the disk 90 as a whole is adjusted to come close to the center axis 9.

The ball retainer portion 34b preferably includes a bottom portion 42, an inner peripheral wall 43 and an outer peripheral wall 44. The bottom portion 42 is a portion positioned below the balls 35. The inner peripheral wall 43 is a substantially cylindrical portion positioned radially inwards of the balls 35. The outer peripheral wall 44 is a substantially cylindrical portion positioned radially outwards of the balls 35. The groove 41 is a space surrounded by the upper surface of the bottom portion 42, the outer circumferential surface of the inner peripheral wall 43 and the inner circumferential surface of the outer peripheral wall 44.

An annular antiskid member 45 is attached to the upper surface of the bottom portion 42. The balls 35 are placed on the upper surface of the antiskid member 45. In other words, the upper surface of the bottom portion 42 serves as a bottom rolling surface 42a that supports the balls 35 through the antiskid member 45. During rotation of the brushless motor 13, the balls 35 are imparted with a centrifugal force and come into contact with the inner circumferential surface of the outer peripheral wall 44. In this way, the inner circumferential surface of the outer peripheral wall 44 serves as a side rolling surface 44a with which the balls 35 make contact.

The antiskid member 45 is made of, e.g., an elastic material. Examples of the elastic material include polyurethane. Thus, the vibration propagating downwards from the balls 35 during the rolling movement of the balls 35 is absorbed and reduced by the antiskid member 45. This reduces the vibration propagating from the balls 35 to the bottom portion 42 of the turntable 34 through the antiskid member 45.

No antiskid member 45 is attached to the side rolling surface 44a of the turntable 34. This is to reduce the resistance against the balls 35, thereby allowing the balls 35 to smoothly roll along the circumferential direction. Thus, the balls 35 make direct contact with the side rolling surface 44a. For that reason, during the rolling movement of the balls 35, the vibration generated by the balls 35 rolling along the outer peripheral wall 44 is likely to propagate to the turntable 34.

The rotor holder 32 and the turntable 34 of the present preferred embodiment are unified by insert-molding. This means that the upper surface of the circular plate portion 32b of the rotor holder 32 is closely secured to the lower surfaces of the planar portion 34a and the ball retainer portion 34b of the turntable 34. In this regard, the terms "closely secured" mean that the rotor holder 32 and the turntable 34 are directly fixed to each other by insert-molding with no use of an adhesive agent.

In the present preferred embodiment, as mentioned above, the resin-made turntable 34 is closely secured to the metal-made rotor holder 32 having greater rigidity than the turntable 34. Thus, the natural frequency of the turntable 34 arranged in the chucking device 4 becomes greater than the natural frequency of the turntable 34 as a single body. Moreover, the natural frequency of the closely-secured turntable 34 becomes greater than the natural frequency of the turntable 34 fixed to the rotor holder 32 by other fixing methods such as bonding or welding. This reduces the amplitude of the vibration generated in the turntable 34 during the rolling movement of the balls 35, consequently reducing the noises generated by the rolling movement of the balls 35.

In the present preferred embodiment, the rotor holder 32 and the turntable 34 are closely secured to each other in the position below the ball retainer portion 34b including the bottom rolling surface 42a and the side rolling surface 44a. In other words, the rotor holder 32 and the turntable 34 are closely secured to each other in the position near the balls 35 as a noise source. Thus, the noises generated by the rolling movement of the balls 35 are reduced in a more effective manner.

An annular cover member 46 is attached to the upper portion of the ball retainer portion 34b. The cover member 46 serves to close the upper portion of the groove 41 and to prevent the balls 35 from escaping upwards. The cover member 46 is made of, e.g., a zinc-coated steel plate, a tin-coated steel plate or a resin. The cover member 46 of the present preferred embodiment consists of only a radially-extending planar upper cover portion 46a. Thus, the cover member 46 does not impose restrictions on the radial position or dimension of the inner peripheral wall 43 and the outer peripheral wall 44. This makes it possible to design the ball retainer portion 34b with an increased degree of freedom in respect of the radial position or dimension of components.

Figure 6:
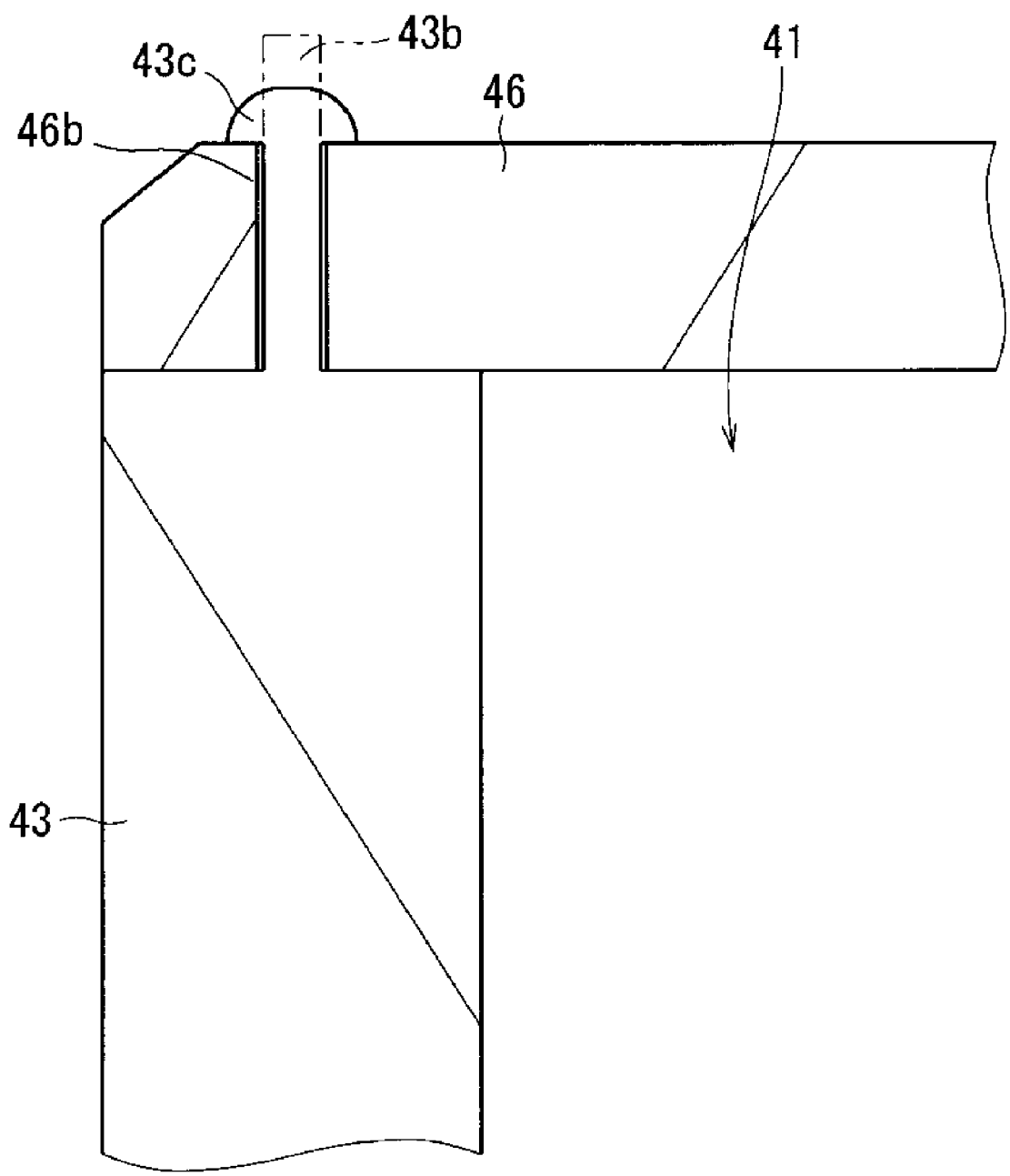
FIG. 6 is a partial vertical section view showing a turntable and a cover member.

The cover member 46 is fixed to the ball retainer portion 34b of the turntable 34 by, e.g., welding. FIG. 6 is a partial vertical section view showing the turntable 34 with a fused portion 43c and the cover member 46.

The process of fixing the cover member 46 to the turntable 34 by thermal welding is performed in the following sequence. First, a projection pin 43b provided in the upper end portion of the inner peripheral wall 43 is inserted into a through-hole 46b formed in the cover member 46. Then, the tip end of the projection pin 43b protruding upwards beyond the through-hole 46b is melt by heating or other methods. The tip end thus melt is spread out on the upper surface of the cover member 46 to close the through-hole 46b, resultantly forming a fused portion 43c.

The turntable 34 and the cover member 46 are strongly fixed to each other by the fused portion 43c. This makes it possible to fix the turntable 34 and the cover member 46 without having to use an adhesive agent. Thus, there is no likelihood that an adhesive agent adheres to the groove 41 and hinders the rolling movement of the balls 35.

In the present preferred embodiment, as shown in FIG. 5, the axial dimension dl from the upper surface of the disk support member 36 to the lower surface of the upper cover portion 46a of the cover member 46 is smaller than the axial dimension d2 from the upper surface of the antiskid member 45 to the contact surface of the turntable 34 and the circular plate portion 32b. Such a dimensional relationship allows the balls 35 to be arranged in an axial position nearer to the disk 90. As a result, the balls 35 can more effectively play the role of correcting the gravity center deviation attributable to the eccentricity in the gravity center of the disk 90.

As an embodiment, FIG. 5 illustrates the rotor holder 32 includes a circular plate portion 32b having an upper surface 32b'; and a substantially cylindrical holder portion 32c having a first outer surface 32c' extending downwards from a radial outer edge 32b" of the upper surface 32b' of the circular plate portion. The substantially cylindrical holder portion 32c holds a magnet 33 on an inner circumferential surface 32c". The substantially cylindrical outer peripheral wall 44 has a second outer surface 44c. A lower end 44c' of the second outer surface 44c is located below the upper surface 32b'. The first outer surface 32c' is continued to the second outer surface 44c with a step 44e. The rotor holder has a thickness (T) at the round surface 32e. The thickness at the round surface is shorter than a diameter (2R) of each of the balls. The round surface 32e has a curvature (1/r) which is larger than the curvature (1/R) of the ball.

In the present preferred embodiment, the outer circumferential surface 44b of the outer peripheral wall 44 of the turntable 34 has substantially the same radius as that of the outer circumferential surface of the holder portion 32c of the rotor holder 32. In other words, the outer peripheral wall 44 of the turntable 34 does not heavily protrude radially outwards from the holder portion 32c of the rotor holder 32. This helps prevent the outer peripheral wall 44 of the turntable 34 from vibrating as a cantilever type vibrator. Accordingly, it is possible to further reduce the noises generated by the rolling movement of the balls 35.

(2-4. Insert-Molding Sequence)

Figure 7:
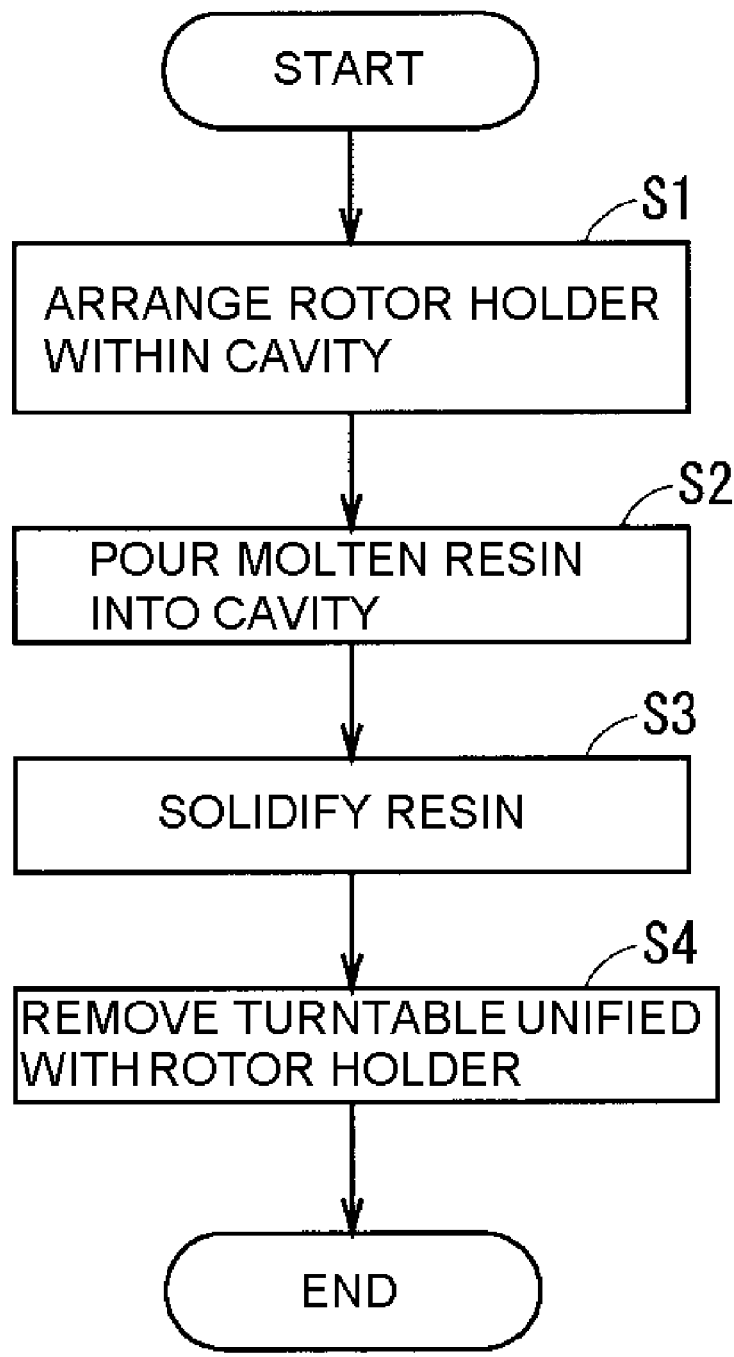
FIG. 7 is a flowchart illustrating the sequence of insert-molding.

Next, description will be made on the sequence of unifying the rotor holder 32 and the turntable 34 by insert-molding in the manufacturing process of the chucking device 4. FIG. 7 is a flowchart illustrating the insert-molding sequence.

A pair of molds and a preformed rotor holder 32 are prepared to carry out the insert-molding sequence. The rotor holder 32 is produced by, e.g., press forming. A cavity is defined by bringing the molds into contact with each other in a mutually opposing relationship. The shape of the cavity corresponds to the shape of the rotor holder 32 and the turntable 34 unified.

First, the rotor holder 32 is set within one of the molds. Then, a cavity is defined inside the molds by closing the molds in a mutually opposing relationship. Thus, the rotor holder 32 is arranged within the cavity (step S1). Next, a molten resin is poured into the cavity (step S2). The molten resin is poured into the cavity through a gate provided in at least one of the molds.

Once the molten resin is uniformly spread out in the space excluding the rotor holder 32, the resin filled in the cavity is cooled and solidified (step S3). The resin thus solidified forms a turntable 34. Consequently, the rotor holder 32 and the turntable 34 are unified into one piece.

Through the steps noted above, the turntable 34 is formed into a shape having a planar portion 34a, a ball retainer portion 34b and a protrusion portion 34c. The ball retainer portion 34b is formed to have a bottom portion 42, an inner peripheral wall 43 and an outer peripheral wall 44. Also formed at this time are a bottom rolling surface 42a, i.e., the upper surface of the bottom portion 42, and a side rolling surface 44a, i.e., the inner circumferential surface of the outer peripheral wall 44. In step S3, the upper surface of the circular plate portion 32b of the rotor holder 32 is closely secured to the lower surfaces of the planar portion 34a and the ball retainer portion 34b of the turntable 34.

Thereafter, the molds are opened to remove the rotor holder 32 and the turntable 34 thus unified (step S4).

In the chucking device 4 manufactured through the aforementioned steps, the circular plate portion 32b of the rotor holder 32 as a metallic member is closely secured to the lower surface of the resin-made turntable 34. Thus, the natural frequency of the turntable 34 arranged in the chucking device 4 becomes greater than the natural frequency of the turntable 34 as a single body. Moreover, the natural frequency of the closely-secured turntable 34 becomes greater than the natural frequency of the turntable 34 fixed to the rotor holder 32 by other fixing methods such as bonding or welding. This reduces the amplitude of the vibration propagating from the balls 35 during the rolling movement of the balls 35, consequently reducing the noises generated by the rolling movement of the balls 35.

(3. Modified Examples)

While the preferred embodiment of the present invention has been described above by way of example, the present invention is not limited to the foregoing embodiment.

Figure 8:
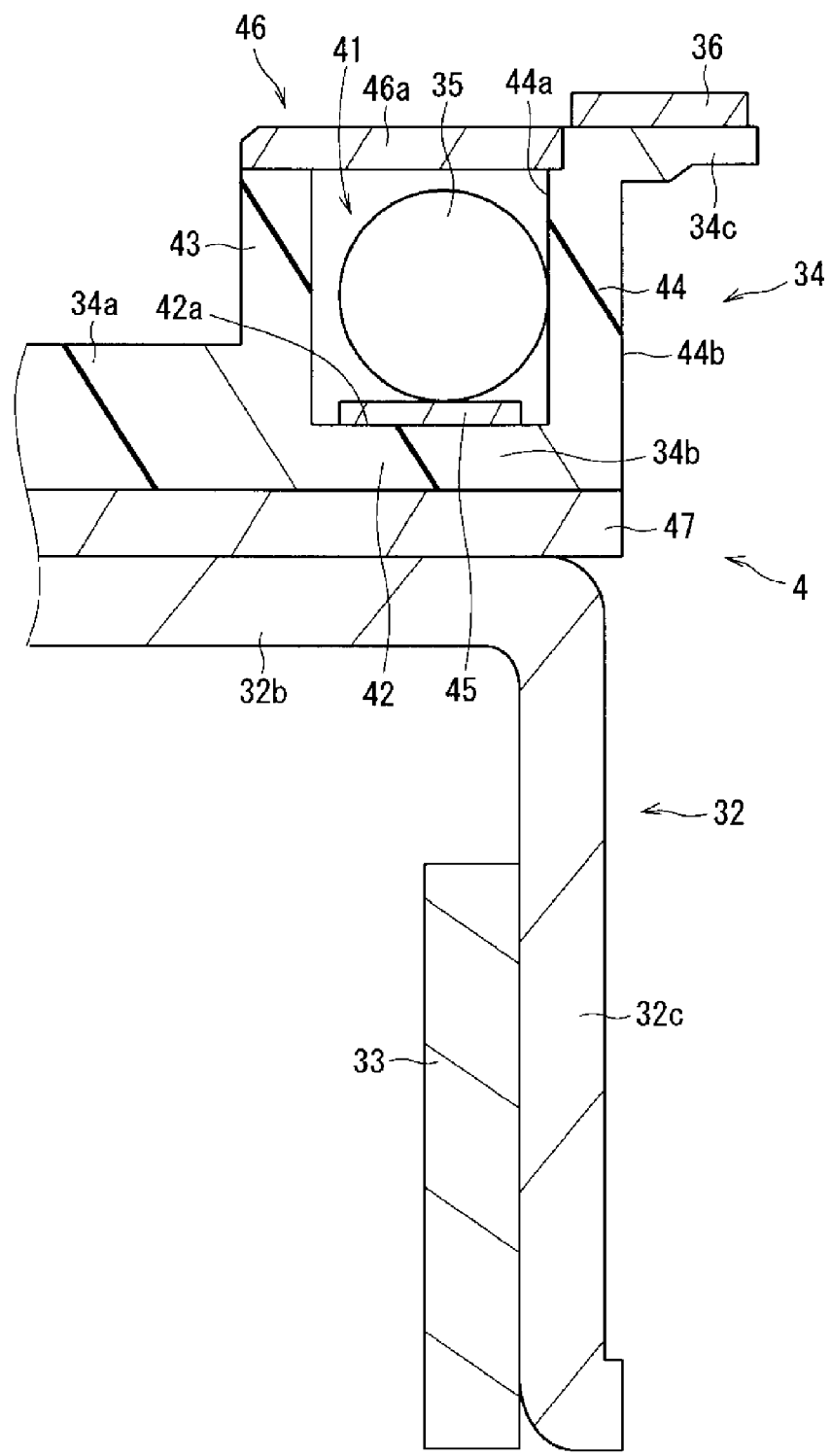
FIG. 8 is a partial vertical section view showing the outer circumferential portion of a rotary unit of a modified example and its vicinities.

In the foregoing preferred embodiment, the turntable 34 is closely secured to the circular plate portion 32b of the rotor holder 32 as a metallic member. In a modified example, as shown in FIG. 8, the circular plate portion 32b may be closely secured to a circular plate member 47 which is a metallic member provided independently of the rotor holder 32. In the modified example shown in FIG. 8, the circular plate member 47 is arranged between the rotor holder 32 and the turntable

34. A through-hole (not shown) is defined in the circular plate member 47. A shaft is press-fitted into the through-hole. The turntable 34 and the circular plate member 47 are unified by insert-molding. Thus, the lower surfaces of the planar portion 34a and the ball retainer portion 34b of the turntable 34 are closely secured to the upper surface of the circular plate member 47. This helps reduce the noises generated by the rolling movement of the balls 35.

Figure 9:
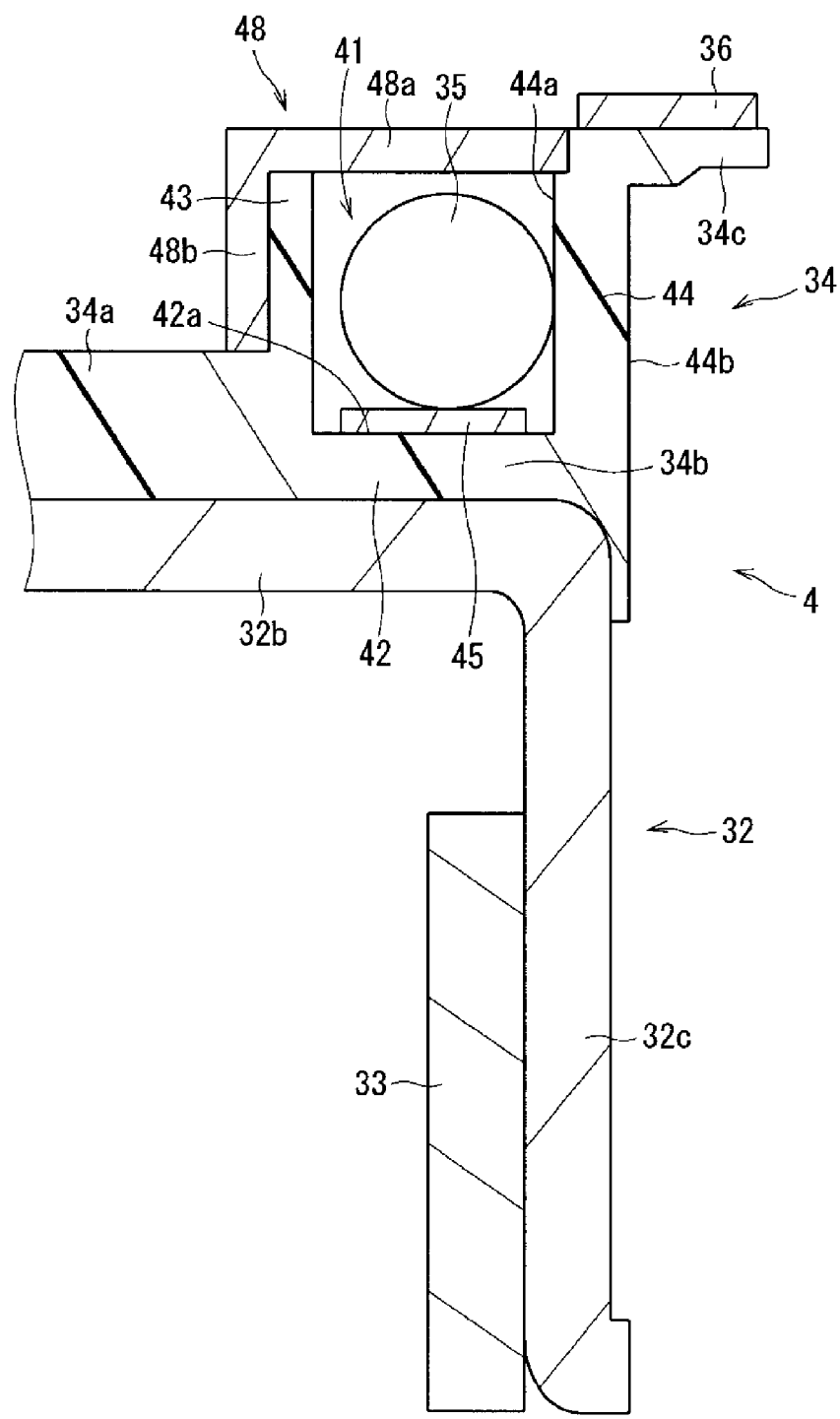
FIG. 9 is a partial vertical section view showing the outer circumferential portion of a rotary unit of another modified example and its vicinities.

In the foregoing preferred embodiment, the chucking device 4 includes the cover member 46 substantially having only of the upper cover portion 46a. As another modified example, the chucking device 4 may include a cover member 48 shown in FIG. 9. Referring to FIG. 9, the cover member 48 preferably includes a upper cover portion 48a and an inner cylinder portion 48b. The inner cylinder portion 48b is a portion having a substantially cylindrical shape and extending downwards from the radial inner end of the upper cover portion 48a.

In the modified example shown in FIG. 9, the inner cylinder portion 48b is positioned radially inwards of the inner peripheral wall 43 of the turntable 34. The inner cylinder portion 48b of the cover member 48 is press-fitted to the inside of the inner peripheral wall 43. Thus, the cover member 48 is strongly fixed to the turntable 34. This helps prevent the cover member 48 from being separated from the turntable 34 even when there are generated impacts of the balls 35 or other kinds of shocks.

In the modified example shown in FIG. 9, the inner cylinder portion 48b of the cover member 48 does not make contact with the balls 35. Therefore, no noise is generated by the contact of the balls 35 with the inner cylinder portion 48b. The inner peripheral wall 43 of the turntable 34 and the inner cylinder portion 48b of the cover member 48 may be fixed to each other through an adhesive agent or other members.

The inner cylinder portion 48b of the cover member 48 may be arranged radially outwards of the inner peripheral wall 43. The chucking device 4 may be provided with a turntable 34 that includes the cover member 48 having the upper cover portion 48a and the inner cylinder portion 48b as shown in FIG. 9 but does not include the inner peripheral wall 43. In other words, the balls 35 may be accommodated within a closed space surrounded by the bottom rolling surface 42a of the turntable 34, the side rolling surface 44a of the turntable 34, the lower surface of the upper cover portion 48a of the cover member 48 and the outer circumferential surface of the inner cylinder portion 48b of the cover member 48.

Figure 10:
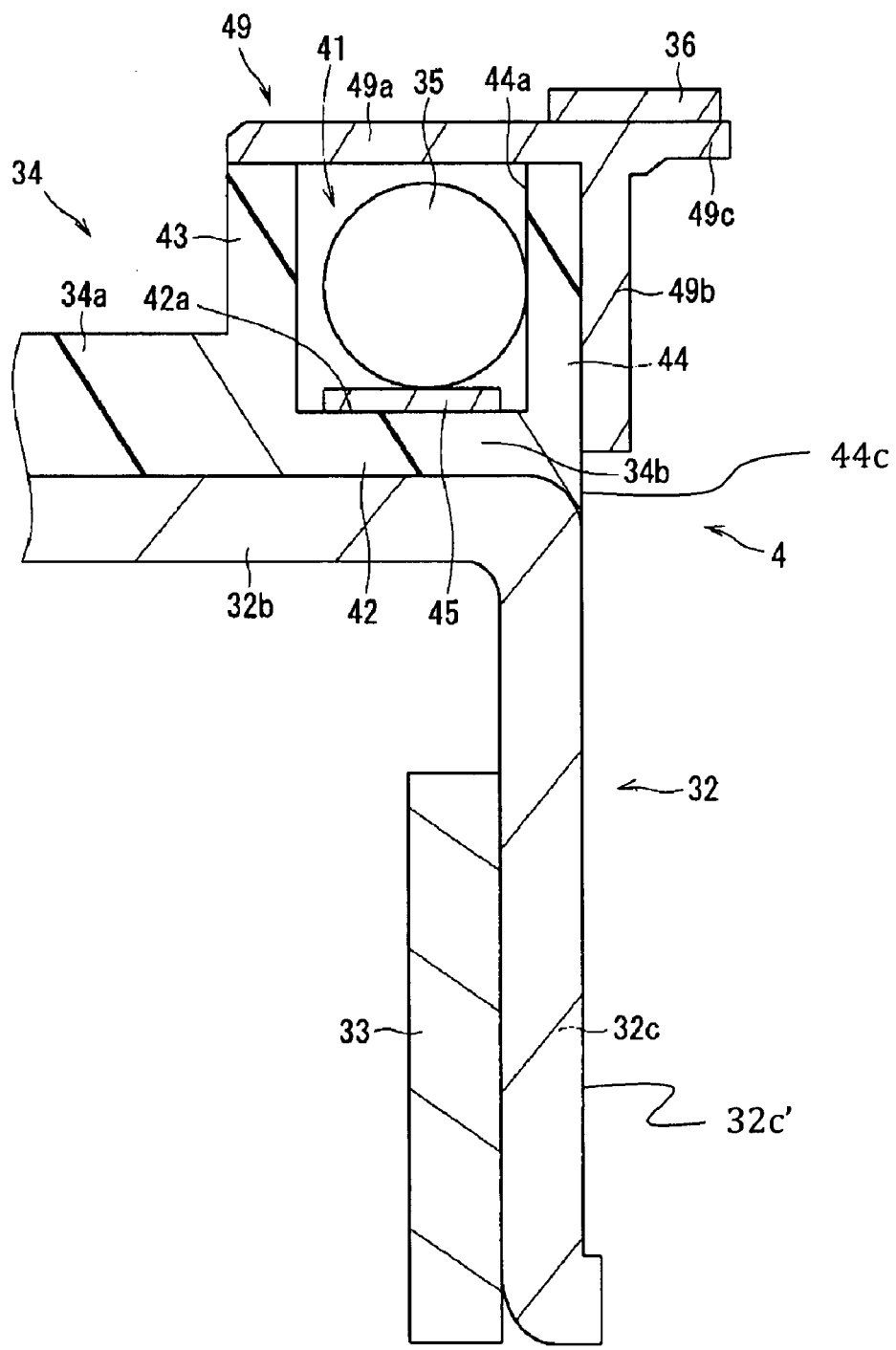
FIG. 10 is a partial vertical section view showing the outer circumferential portion of a rotary unit of a further modified example and its vicinities.

As a further modified example, the chucking device 4 may be provided with a cover member 49 as shown in FIG. 10. The cover member 49 includes an upper cover portion 49a, an outer cylinder portion 49b and a protrusion portion 49c. The outer cylinder portion 49b is a cylindrical portion extending downwards from the radial outer end of the upper cover portion 49a. The protrusion portion 49c is a portion protruding radially outwards from the upper end of the outer cylinder portion 49b. The disk support member 36 is fixed to the upper surface of the protrusion portion 49c of the cover member 49.

In the modified example shown in FIG. 10, the outer cylinder portion 49b is positioned radially outwards of the outer peripheral wall 44 of the turntable 34. The outer peripheral wall 44 of the turntable 34 is press-fitted to the inside of the outer cylinder portion 49b of the cover member 49. Thus, the cover member 49 is strongly fixed to the turntable 34. This helps prevent the cover member 49 from being separated from the turntable 34 even when there are generated impacts of the balls 35 or other kinds of shocks.

In the modified example shown in FIG. 10, the outer cylinder portion 49b of the cover member 49 does not make contact with the balls 35. Therefore, no noise is generated by the contact of the balls 35 with the outer cylinder portion 49b. The outer peripheral wall 44 of the turntable 34 and the outer cylinder portion 49b of the cover member 49 may be fixed to each other through an adhesive agent or other members.

As illustrated in FIG. 10, the first outer surface 32c' is straightly continued to the second outer surface 44c.

In the foregoing preferred embodiment, the disk support member 36 is fixed to the upper surface of the turntable 34. As a modified example, the disk support member 36 may be fixed to the upper surface of the cover member 49 as shown in FIG. 10. In other words, the disk support member 36 may be directly or indirectly supported by the turntable 34 from below. If the disk support member 36 is arranged on the upper surface of the cover member 49 as shown in FIG. 10, there is no need to arrange the entirety of the cover member 49 radially inwards of the disk support member 36. Accordingly, the brushless motor 13 can be designed with an increased degree of freedom in respect of the radial position or dimension of components.

Figure 11:
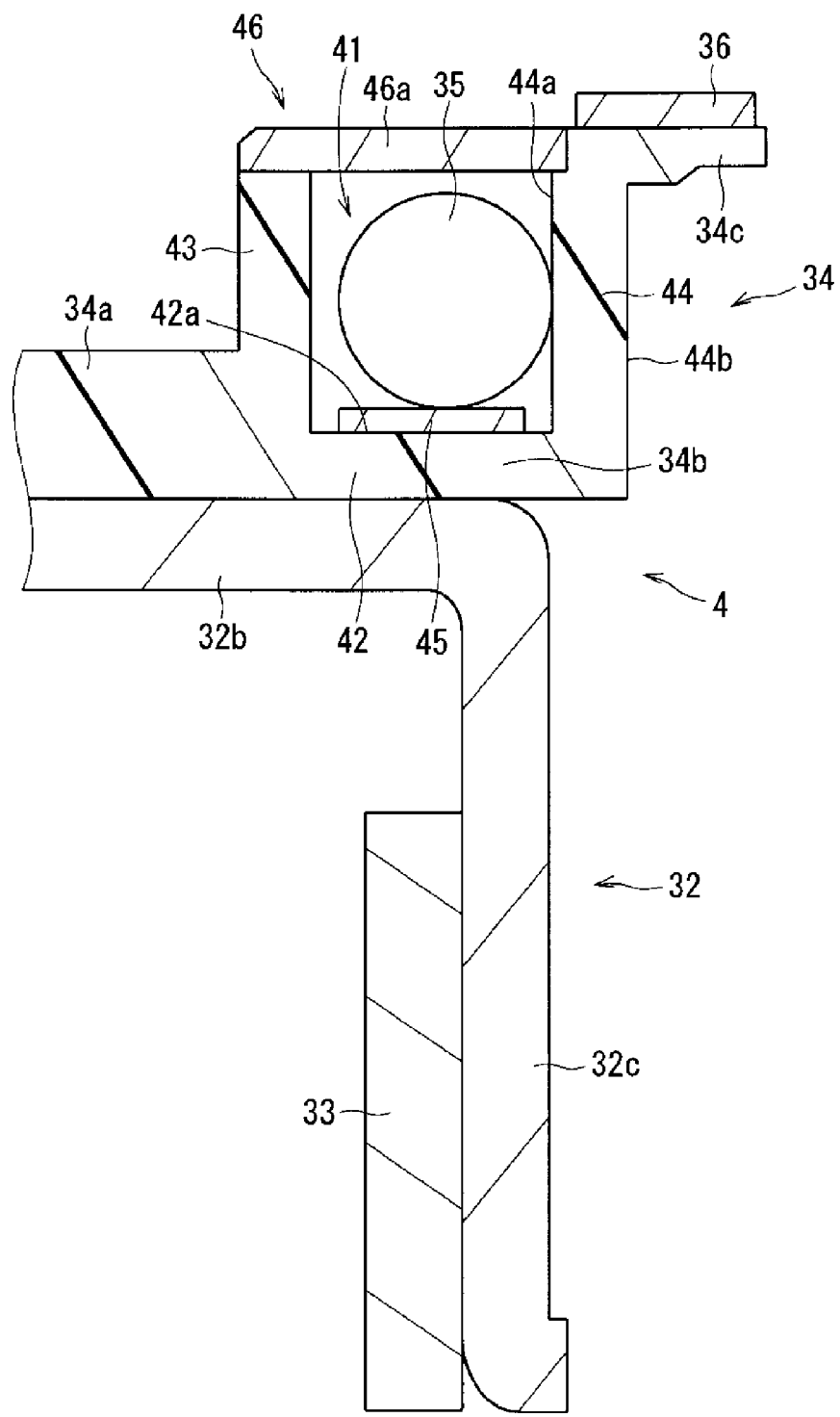
FIG. 11 is a partial vertical section view showing the outer circumferential portion of a rotary unit of a still further modified example and its vicinities.

It is not always necessary that the lower surface of the turntable 34 be closely secured to the rotor holder 32 in its entirety. For example, as shown in FIG. 11, one portion of the radial outer area of the lower surface of the turntable 34 may be separated from the metal member. In the modified example shown in FIG. 11, the outer peripheral wall 44 of the turntable 34 is arranged radially outwards of the outer circumferential surface of the holder portion 32c of the rotor holder 32. Even with this configuration, the turntable 34 and the rotor holder 32 are closely secured to each other in some areas, whereby the noises generated by the rolling movement of the balls 35 become smaller than the noises generated in the prior art.

Figure 12:
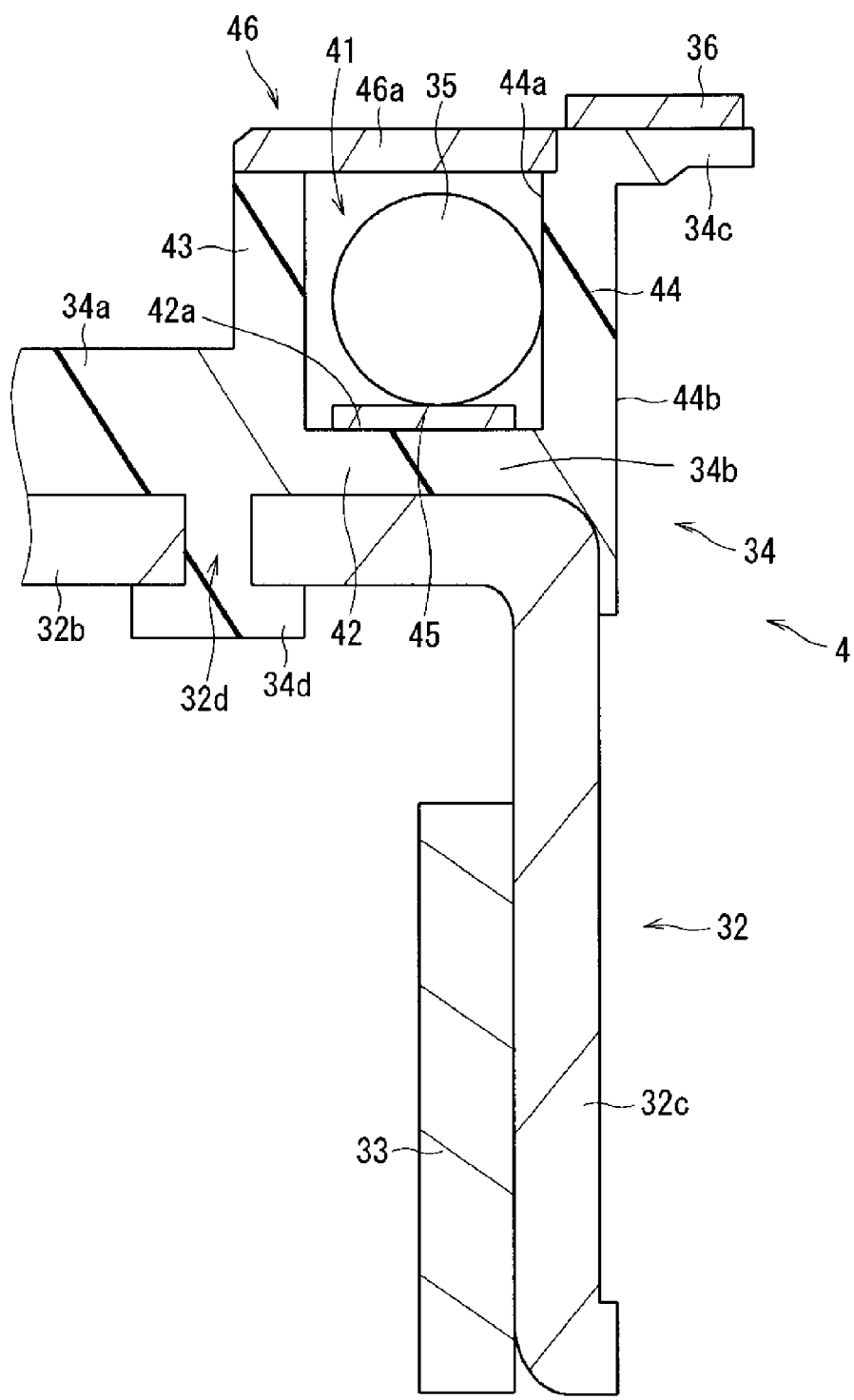
FIG. 12 is a partial vertical section view showing the outer circumferential portion of a rotary unit of a yet still further modified example and its vicinities.

As shown in FIG. 12, the turntable 34 may include an engagement portion 34d provided below the circular plate portion 32b of the rotor holder 32. In the modified example shown in FIG. 12, an axially extending through-hole 32d is defined in the circular plate portion 32b of the rotor holder 32. The molten resin poured into the cavity during the process of insert-molding the turntable 34 flows toward the underside of the circular plate portion 32b through the through-hole 32d, thereby forming the engagement portion 34d.

The engagement portion 34d is closely secured to the lower surface of the circular plate portion 32b of the rotor holder 32. Moreover, the rotor holder 32 and the turntable 34 are closely secured to each other in the through-hole 32d. Thus, the rotor holder 32 and the turntable 34 are closely secured to each other over a contact area broader than available in the foregoing preferred embodiment. This further reduces the noises generated by the rolling movement of the balls 35.

In addition, a through-hole corresponding to the through-hole 32d may be defined in the circular plate member 47 of the modified example shown in FIG. 8. In this case, the molten resin poured into the cavity during the process of insert-molding the turntable 34 flows into the through-hole of the circular plate member 47 and then the through-hole 32d of the rotor holder 32, thereby forming the engagement portion 34d.

Figure 13:
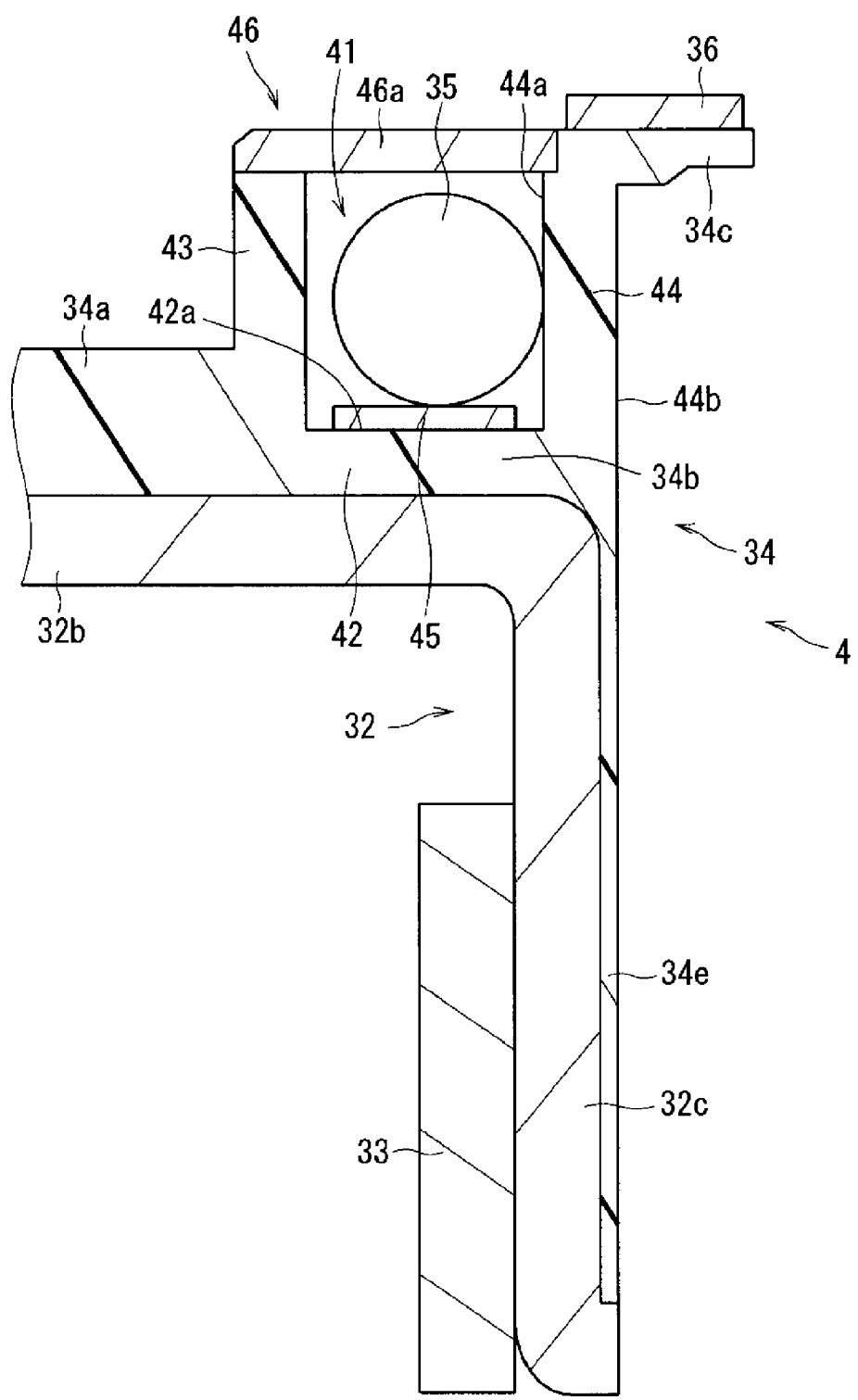
FIG. 13 is a partial vertical section view showing the outer circumferential portion of a rotary unit of an additionally yet still further modified example and its vicinities.

As shown in FIG. 13, the turntable 34 may include an outer layer portion 34e arranged to cover the outer circumferential surface of the holder portion 32c of the rotor holder 32. With this configuration, the rotor holder 32 and the turntable 34 are closely secured to each other over a contact area broader than available in the foregoing preferred embodiment. This further reduces the noises generated by the rolling movement of the balls 35.

The terms "the lower surface of the turntable" used herein may not necessarily designate the surface of the lowermost portion of the turntable. Even when the turntable 34 has a portion positioned below the circular plate portion 32b of the rotor holder 32 as shown in FIGS. 12 and 13, there is no problem if the lower surfaces of the planar portion 34a and the ball retainer portion 34b of the turntable 34 are closely secured to the upper surface of the circular plate portion 32b of the rotor holder 32.

As in the foregoing preferred embodiment, a cone 37 supporting the inner circumferential portion of the disk 90 may be provided independently of the turntable 34 of the chucking device 4. As another modified example, a mechanism supporting the inner circumferential portion of the disk 90 may be provided in the turntable 34 itself.

The chucking device of the present embodiment may be used to hold the optical disk 90 as in the foregoing preferred embodiment or to hold other recording disks (removable disks) such as a magnetic disk and the like. A demand for correction of the eccentricity in the gravity centers of individual disks is particularly high in a chucking device that removably holds the disks. Under these circumstances, it is technically significant to apply the present invention to the chucking device that removably holds the disks.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor, comprising:
a stationary unit comprising a stator; and
a rotary unit comprising a rotor holder and a chucking device, wherein the rotor holder is made of a metal member, the rotor holder comprising:
a circular plate portion having an upper surface; and
a substantially cylindrical holder portion having a first outer surface extending downwards from a radial outer edge of the upper surface of the circular plate portion, the substantially cylindrical holder portion holding a magnet on an inner circumferential surface thereof, the stator radially opposed to the magnet,
wherein the chucking device comprising:
a turntable made of a resin having a substantially cylindrical outer peripheral wall extending downward, the substantially cylindrical outer peripheral wall having a second outer surface; and
a plurality of balls arranged inside the substantially cylindrical outer peripheral wall to roll in a circumferential direction with respect to a center axis,
wherein the turntable is secured to the circular plate portion, such that
a lower end of the second outer surface is directly attached to the rotor holder, the lower end located below the upper surface.

2. The motor of claim 1, wherein the chucking device further comprises:
a disk support unit on which a disk is placed;
wherein the turntable further comprises:
an antiskid member;
a bottom rolling surface arranged to support the balls from below through the antiskid member; and
a cylindrical side rolling surface positioned radially outwards of the balls.

3. The motor of claim 2, wherein the metal member is secured to a lower surface of the turntable in a position below at least the bottom rolling surface.

4. The motor of claim 2, wherein the turntable includes an annular groove surrounded by the bottom rolling surface, the side rolling surface and an inner peripheral wall, and
the chucking device further comprises a cover member including an upper cover portion arranged to cover an opening of the groove.

5. The motor of claim 4, wherein the cover member further includes an inner cylinder portion extending downwards from a radial inner end of the upper cover portion, the inner cylinder portion being positioned radially inwards of the inner peripheral wall.

6. The motor of claim 4, wherein the cover member further includes an outer cylinder portion extending downwards from a radial outer end of the upper cover portion, the outer cylinder portion being positioned radially outwards of an outer circumferential surface of the turntable.

7. The motor of claim 6, wherein the turntable includes a substantially cylindrical outer peripheral wall positioned radially outwards of the balls, the outer peripheral wall being press-fitted to an inside of an outer cylinder portion of the cover member.

8. The motor of claim 4, wherein the turntable includes a fused fixing portion positioned on an upper surface of the cover member.

9. The motor of claim 8, wherein a through-hole is defined in the cover member, the fused portion being positioned to close the through-hole.

10. The motor of claim 4, wherein an axial dimension from an upper surface of the disk support unit to a lower surface of the upper cover portion is smaller than an axial dimension from an upper surface of the antiskid member to a lower surface of the turntable.

11. The motor of claim 4, wherein the disk support unit is arranged on an upper surface of the cover member.

12. The motor of claim 2, further comprising: a cover member including an upper cover portion arranged above the balls and an inner cylinder portion extending downwards from a radial inner end of the upper cover portion, the balls being accommodated within a closed space surrounded by the bottom rolling surface, the side rolling surface, a lower surface of the upper cover portion and an outer circumferential surface of an inner cylinder portion.

13. The motor of claim 2, further comprising: a circular plate member provided between the turntable and the metal member.

14. The motor of claim 2, further comprising: an axially slidable cone arranged to support the inner circumferential portion of the disk, the turntable including a planar portion extending radially and an axially extensible/contractible spring member arranged between the planar portion and the cone, the cone including a slant surface whose diameter gets gradually increased axially downwards.

15. The motor of claim 2, wherein a lower surface of the turntable includes a radial outer area separated from the metal member.

16. A disk drive apparatus comprising:
the motor of claim 1;
an access unit arranged to perform at least one of information reading and writing operations with respect to the disk held in the rotary unit of the motor; and
a housing arranged to accommodate the motor and the access unit.

17. The motor of claim 1, wherein the first outer surface is straightly continued to the second outer surface.

18. The motor of claim 1, wherein the first outer surface is continued to the second outer surface with a step.

19. The motor of claim 1, wherein the turntable is made by an insert molding process in which a mold for the insert molding process has included the metal member.

20. The motor of claim 1, wherein the substantially cylindrical holder portion having the first outer surface extends downwards from the radial outer edge of the upper surface of the circular plate portion via a round surface.

21. The motor of claim 20, wherein the rotor holder has a thickness at the round surface (T) shorter than a diameter (2R) of each of the balls.

22. The motor of claim 20, wherein the round surface has a curvature (1/r), wherein each of the balls has another curvature (1/R), wherein the curvature (1/r) is larger than the curvature (1/R).

23. The motor of claim 1, wherein the turntable is secured to the circular plate portion by insert-molding.

* * * * *